(12) United States Patent
Wilcox

(10) Patent No.: US 6,490,390 B1
(45) Date of Patent: Dec. 3, 2002

(54) GRATING WRITING SYSTEMS BASED ON AN ACOUSTO-OPTIC ELEMENT

(75) Inventor: Russell Wilcox, Fremont, CA (US)

(73) Assignee: Phaethon Communications, Fremont, CA (US)

( * ) Notice: Subject to any disclaimer, the term of this patent is extended or adjusted under 35 U.S.C. 154(b) by 0 days.

(21) Appl. No.: 09/878,122

(22) Filed: Jun. 8, 2001

Related U.S. Application Data
(60) Provisional application No. 60/260,191, filed on Jan. 5, 2001.

(51) Int. Cl.[7] .................................................. G02B 6/26
(52) U.S. Cl. ......................................................... 385/27
(58) Field of Search ............................... 385/37; 372/20, 372/6, 102; 369/44.12, 112.27, 112.29, 44.23; 356/460, 479; 600/437, 425; 359/308, 110, 32

(56) References Cited

U.S. PATENT DOCUMENTS

| | | | | |
|---|---|---|---|---|
| 4,915,503 A | * | 4/1990 | Pavlath | 356/460 |
| 5,384,573 A | * | 1/1995 | Turpin | 342/179 |
| 5,718,226 A | * | 2/1998 | Riza | 600/437 |
| 5,856,355 A | * | 1/1999 | Richter et al. | 514/481 |
| 5,956,355 A | * | 9/1999 | Swanson et al. | 356/479 |
| 6,160,826 A | * | 12/2000 | Swanson et al. | 372/102 |
| 6,351,323 B1 | * | 2/2002 | Onaka et al. | 359/110 |

* cited by examiner

Primary Examiner—Akm E. Ullah
(74) Attorney, Agent, or Firm—Fulbright & Jaworski L.L.P.

(57) ABSTRACT

Optical interferometric techniques and systems for fabricating fiber Bragg gratings in photosensitive optical fibers by using an acousto-optic element to generate and control the radiation pattern with a high resolution. The radiation pattern may be programmable in that different radiation patterns may be produced by controlling the acousto-optic element.

20 Claims, 4 Drawing Sheets

GRATING WRITING SYSTEMS BASED ON AN ACOUSTO-OPTIC ELEMENT

This application claims the benefit of U.S. Provisional Application No. 60/260,191 filed on Jan. 5, 2001.

BACKGROUND

This application relates to Bragg gratings in optical waveguides, and more specifically, to fabrication of such Bragg gratings.

A Bragg grating may be formed in a waveguide such as an optical fiber or a dielectric waveguide by producing a periodic spatial pattern along the waveguide. In a fiber Bragg grating, for example, the product of the effective refractive index, n, of the fiber and the spatial period, $\Lambda$, of the spatial pattern, i.e., the grating parameter, may be either a constant everywhere along the fiber or a monotonic function of the position along the fiber. A spectral component at a wavelength $\lambda$ in an input optical wave to the fiber grating, when satisfying the Bragg resonance condition, $\lambda = 2n\Lambda$, at one location of the fiber Bragg grating, interacts with the grating and is reflected back. Spectral components that do not satisfy the Bragg resonance condition at any location in the fiber grating transmit through the fiber grating.

The periodic spatial pattern may be a spatial modulation of either or both of the amplitude and the phase of the refractive index of the fiber core. In one implementation, the fiber core may be made photosensitive by implanting a photosensitive material in the fiber core. Hence, exposing the fiber core to a desired radiation pattern may be performed to imprint the desired spatial pattern in the fiber core. The desired radiation pattern may be formed by interference of two coherent radiation beams. The two beams may be generated by, e.g., using either a fixed phase mask or an holographic interferometer.

SUMMARY

The present disclosure includes optical interferometric techniques and systems for fabricating waveguide Bragg gratings in photosensitive waveguides such as optical fibers by using an acousto-optic element to generate and control the radiation pattern. A high resolution in the spatial features of the spatial pattern may be achieved by operating and controlling the acousto-optic element. The radiation pattern may be programmable in that different radiation patterns may be produced by controlling the acousto-optic element. A scanning mechanism is provided to spatially scan the fiber relative to the interference pattern so that different sections of the fiber are exposed to form grating patterns which may change with position along the fiber.

One embodiment of the writing system uses two intercepting acoustic waves to produce an acoustic interference pattern to diffract a CW or pulsed input optical beam into two separate but mutually coherent diffraction beams to produce the desired radiation pattern. In another embodiment, a single acoustic wave is used to diffract a pulsed input optical beam to produce the desired radiation pattern.

DETAILED DESCRIPTION

In general, the techniques and systems of the present disclosure use an acousto-optic modulator to generate two mutually-coherent beams by diffracting a single input optical beam. The two beams are then spatially overlapped to produce an interference pattern for writing a grating pattern in a waveguide such as a fiber which is photosensitive. The beam parameters, such as relative phase shifts and beam directions, may be controlled to create small amplitude features in the fiber for forming a fiber grating. These techniques and systems may be used to produce any grating period or phase shift in the grating pattern without limiting other parameters of the systems.

Figure 1:
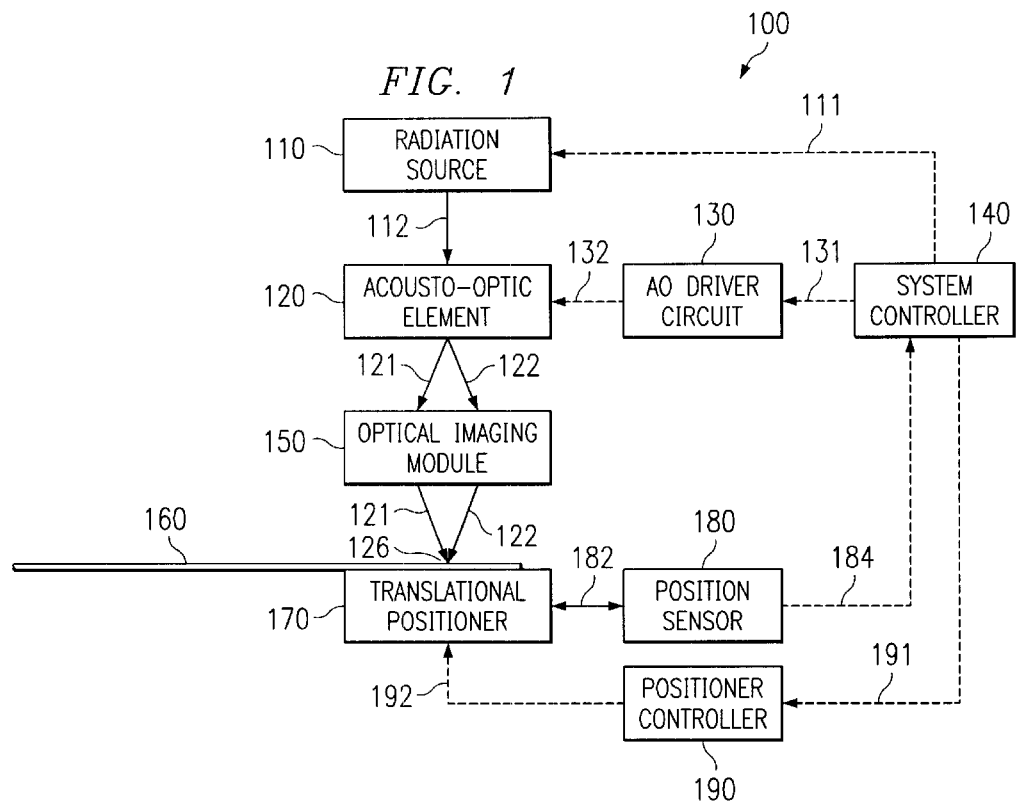
FIG. 1 shown a grating writing system according to one embodiment, wherein solid and dashed lines with arrows represent optical and electrical signals, respectively.

FIG. 1 shows one embodiment of a grating writing system 100. A radiation source 110, such as a laser, is provided to produce a radiation beam 112 at a selected exposure wavelength to which the photosensitive fiber 160 responds to change its refractive index. An acousto-optic element 120 is positioned in the path of the beam 112 to receive the beam 112 in an acousto-optic medium. One or more acoustic transducers are engaged to the acousto-optic medium and operate in response to a driver signal 132 from the driver circuit 130 to produce an acoustic field distribution in the medium. This acoustic field distribution effectuates a diffraction pattern and is operable to diffract the beam 112 into two diffraction beams 121 and 122 that are coherent with each other. The diffraction beams 121 and 122 are not in the same direction but propagate at different diffraction angles. Once combined to overlap each other in space, the two beams 121 and 122 will interfere to produce an interference pattern. The interference pattern at the combined location can be adjusted and controlled by the frequency of the driver signal 132 which may be in the radio frequency range. The frequency of the driver signal 132 can be used to control the relative angle between the beams 121 and 122 and the features of the interference pattern.

An optical imaging module 150 is placed in the optical paths of the diffraction beams 121 and 122 to receive and direct the beams so that they. spatially overlap with each other at a selected common location 126 where the fiber 160 is located. The core of the fiber 160 may be formed of a photosensitive material and therefore the exposure to the interference pattern formed by the diffraction beams 121 and 122 can produce the desired modulation on the refractive index of the fiber core. In addition to overlapping of the beams 121 and 122, the optical imaging module 150 can operate to reimage the beams 121 and 122 to control their relative angle at the location of interception. Since the width of the interference fringes in the interference pattern increases as the their relative angle decreases and decreases as their relative angle increases, the imaging module 150 may be used as one mechanism for controlling the resolution of the spatial pattern formed in the fiber 160.

If the fiber is held stationary at the selected location 126, the grating writing system 100 exposes the fiber 160 to the interference pattern of the diffraction beams 121 and 122 one fiber section at a time. Each exposed section is essentially the size of the overlapping region of the two beams 121 and 122 which is about the size of each diffraction beam. However, it is desirable to write a Bragg grating over an extended length of the fiber 160 and in particular, the grating pattern may vary with position along the fiber 160. Hence, the grating writing system 100 is designed to include a controllable positioning or scanning mechanism to shift the relative position between the fiber 160 and the selected location 126 where beams 121 and 122 overlap so as to expose different sections of the fiber 160 to form the desired fiber grating.

In the illustrated embodiment, the scanning mechanism is implemented by a translational positioner stage 170 which holds the fiber 160 and shifts the position of the fiber 160 along the longitudinal direction of the fiber 160. The radiation source 110, the acousto-optic element 120, and the optical imaging module 150 are fixed in space. The positioner stage 170 is driven and controlled by a positioner controller 190 via a control signal 192. Alternatively, the scanning mechanism may be a positioner stage to which the radiation source 110, the acousto-optic element 120, and the optical imaging module 150 are mounted in a fixed relationship with one another while the fiber 160 is held by a fiber-holding stage at a fixed position.

A position sensor 180 is also provided in the writing system 100 to measure the positions of the translational positioner 170 for controlling the positioner 170. The position sensor 180 may be implemented in various forms, including optical position sensors which use an optical beam 182 to measure and monitor the position. For example, an optical interferometer may be used as the position sensor 180.

The system 100 further uses a system controller 140 to control and coordinate the optical exposure by the beams 121 and 122 and the position of the fiber 160. On one hand, the system controller 140 can produce a control signal 131 to the driver circuit 130 so that a driver signal 132 is generated to produce a desired interference pattern on the fiber 160 at a desired location. On the other hand, the system controller 140 responds to a position signal 184 from the position sensor 180 to command the position controller 190 via a control signal 191 to place the fiber 160 at the next selected position for exposure. The control signals 131 and 191 are synchronized so that a desired spatial grating pattern can be produced in the fiber 160. In addition, the system controller 140 may also control the operation of the radiation source 110, such as turning on or off the beam 112, the power level of the beam 112, and other parameters of the beam 112. For example, if the radiation source 110 is a pulsed laser, its pulse repetition rate may also be controlled and adjusted to achieve the proper optical exposure in the fiber 160.

One unique feature of the grating writing system 100 is the acousto-optic element 120. This is in part because the acousto-optic element 120 is used here to generate the two interfering beams 121 and 122 and in part because it is used to provide the programmability of the system 100. At least one acoustic transducer is engaged to the acousto-optic medium of the element 120 and operates to produce an acoustic wave with a spreading angle $\Phi$ so that multiple orders of diffraction are generated. If the wavelength of the beam 112 is $\lambda$ and the spatial period of the acoustic wave is $\Lambda_{ac}$, the Bragg angle is $\theta = \lambda/(2n_{ao}\Lambda_{ac})$ where nao is the refractive index of the medium. Notably, the acousto-optic element 120 is specially configured to operate under the Raman-Nath regime which requires:

$$Q = \frac{4\pi\theta}{\Phi} < 1.$$

Under this regime, the phase modulation on the beams 121 and 122 created by the acoustic wave is relatively small in comparison to the Bragg regime for Q >1 where the phase modulation is large.

In addition, it is desirable that the beams 121 and 122 be the two first order beams (+1 and −1) and the zero order beam be suppressed. This may be accomplished by appropriate choice of the acousto-optic interaction length and the RF driver power. A beam block may also be used in the optical imaging module 150 to block the zero-order beam if it is not entirely suppressed.

Figure 2A:
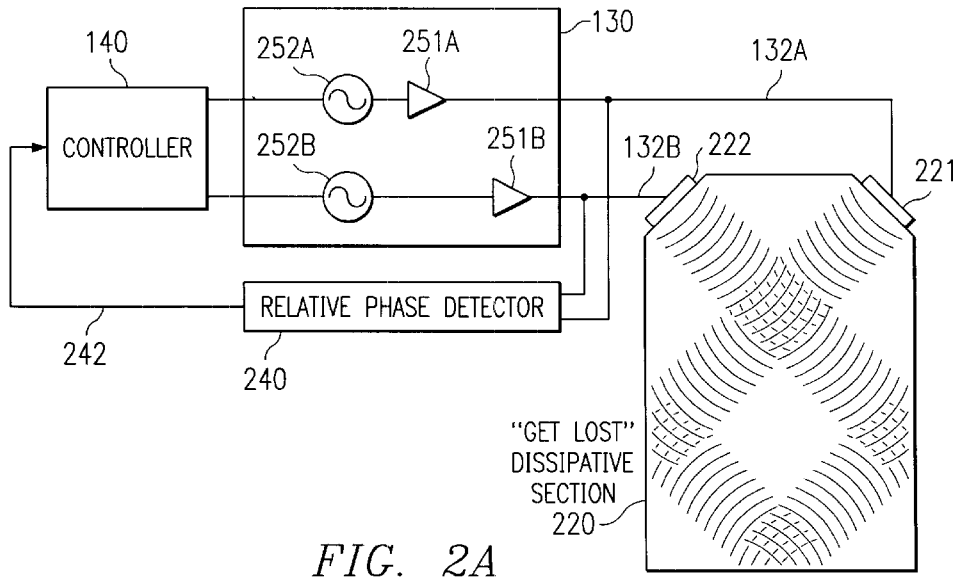
FIG. 2A shows the implementation of the acousto-optic element and its driver circuit in the grating writing system of FIG. 2.
Figure 2:
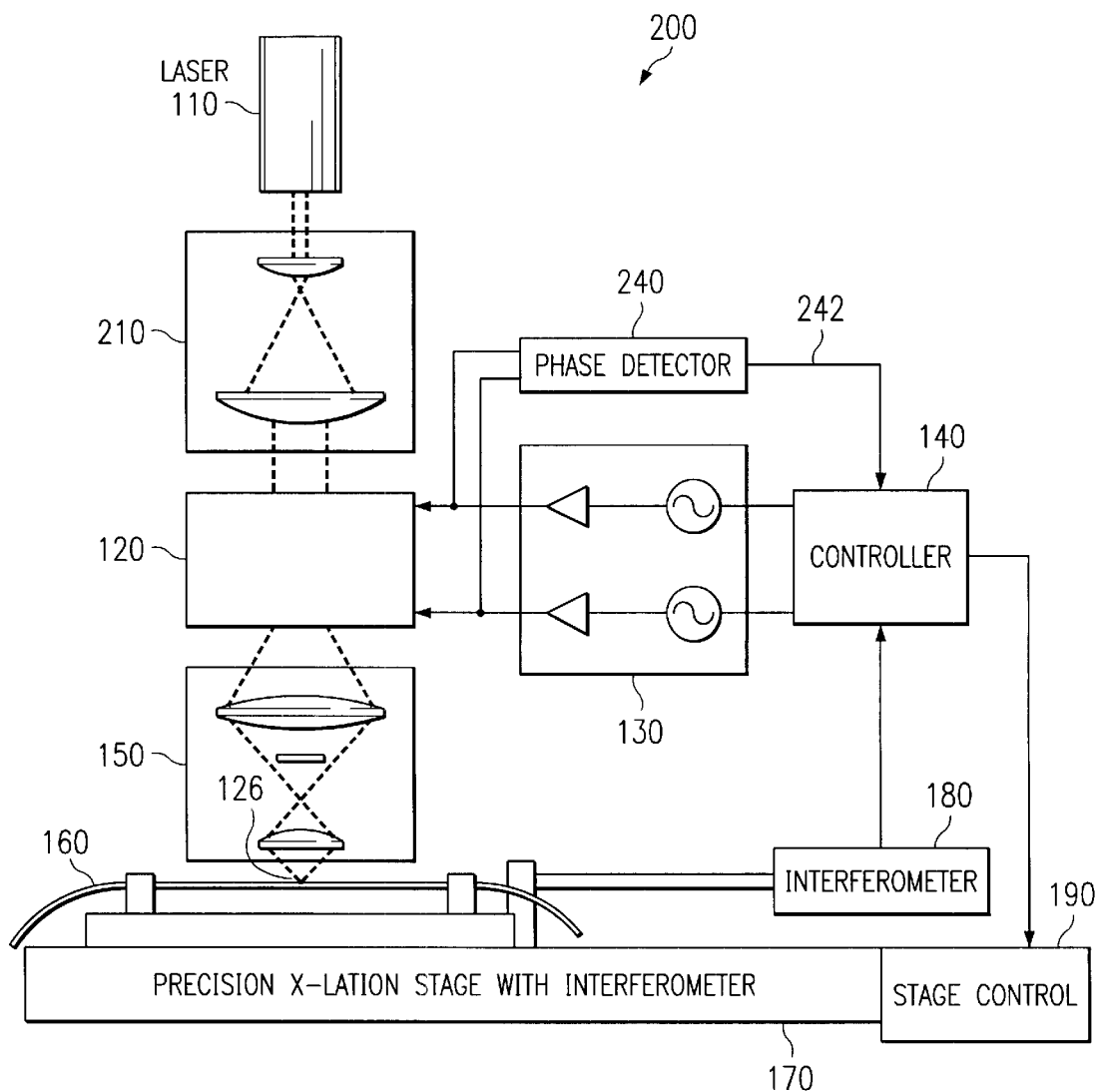
FIG. 2 shows one implementation of the grating writing system shown FIG. 1.
Figure 2B:
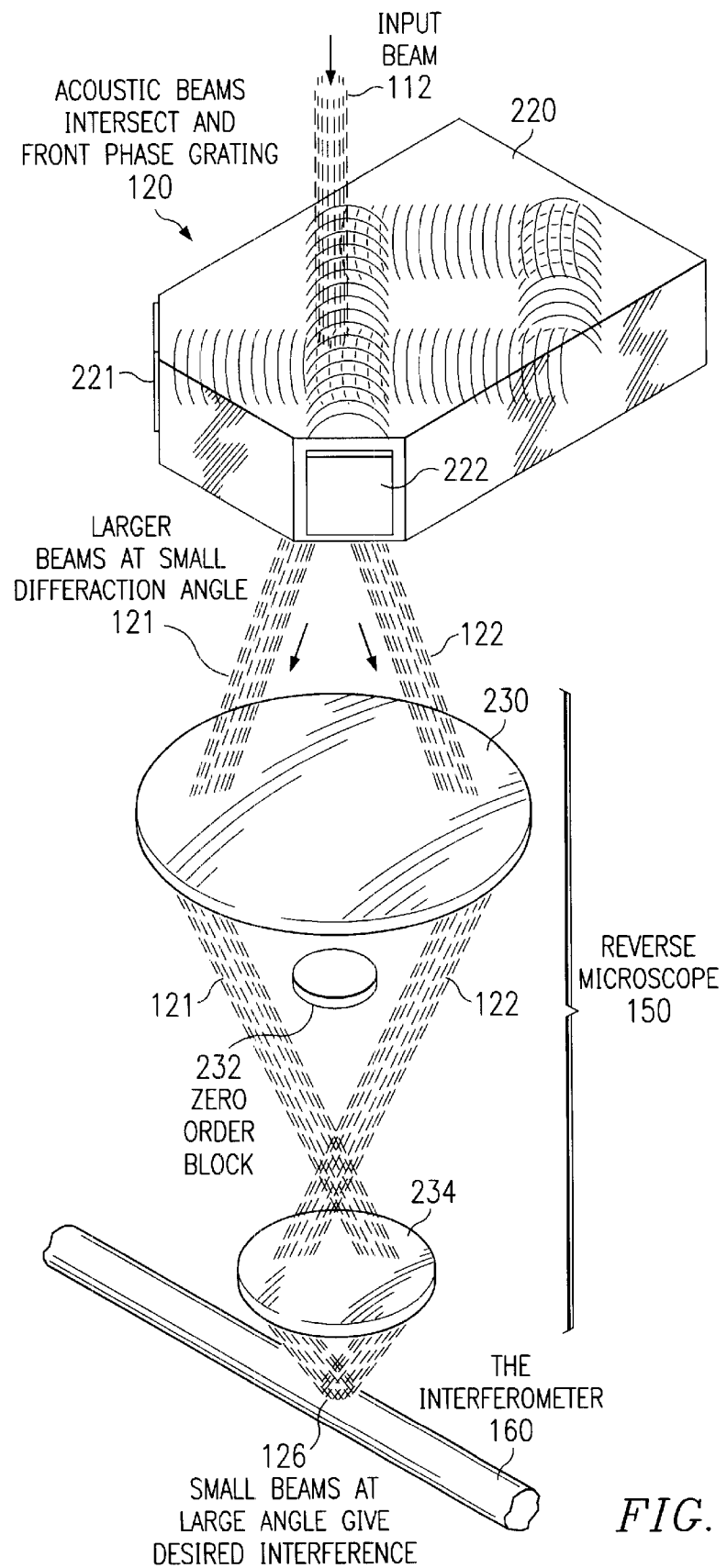
FIG. 2B further shows the implementation of the acousto-optic element and the optical imaging module in the grating writing system of FIG. 2.

FIGS. 2, 2A and 2B illustrate a "standing wave" implementation 200 based on the grating writing system 100 in FIG. 1. In FIGS. 2A and 2B, the acousto-optic element 120 is shown to include an acousto-optic medium 220 (e.g., fused quartz) and two separate acoustic transducers 221 and 222. The medium 220 has two opposing optical surfaces to receive the input beam 112 and to output the beams 121 and 122, respectively. The medium 220 is also shaped to have two transducer surfaces for supporting the transducers 221 and 222 in a way that the acoustic waves generated by the transducers 221 and 222 are at an angle with respect to each other and are substantially perpendicular to the beam 112. The two acoustic waves intercept and interfere with each other in the path of the beam 112 to form an acoustic interference pattern. This acoustic interference pattern is a "standing" wave pattern because it does not travel in the same way as the two acoustic waves. However, this acoustic interference pattern is generally not stationary in space but may be controlled to move in space along with the fiber 160.

The acoustic interference pattern alters the density of the acousto-optic medium 220 and hence creates a phase grating. The phase grating in the medium 220 can be varied and controlled by using the driver circuit 130 to control parameters of the acoustic waves, such as frequencies and phase values. The optical beam 112 can interact with this phase grating to produce the two diffraction beams 121 and 122.

Referring to FIG. 2A, the driver circuit 130 includes two parallel drivers 251A and 251B to respectively drive the transducers 221 and 222. Each driver includes a voltage-controlled oscillator (VCO) 252A or 252B, and an amplifier 251A or 251B. Accordingly, the driver signal 132 in FIG. 1 in this embodiment has two driver signals 132A and 132B, respectively output by the amplifiers 251A and 251B. A relative phase detector 240 is coupled to tap driver signals 132A and 132B and operate to determine the relative phase between the signals 132A and 132B. A phase indicator 242 is then generated by the detector 240. The system controller 140 responds to the phase indicator 242 by controlling the oscillators 252A and 252B so that the relative phase between the signals 132A and 132B is at a desired phase value. In addition, the system controller 140 also controls the frequencies of the oscillators 251A and 251B. This combination of changing and controlling the phases and frequencies of the signals 132A and 132B allows for changing and controlling the interference pattern of-the beams 121 and 122 at the fiber 160.

In particular, the grating writing system 200 in this standing wave configuration can independently control the acoustic transducers 221 and 222 so that the acoustic frequencies of the two intercepting acoustic waves are different from each other by, e.g., a fixed amount. As a result, the acoustic interference pattern is not stationary but moves in space at a speed controlled by the frequency difference. The system 200 is designed so that the moving direction of the acoustic interference pattern is along the longitudinal direction of the fiber 160 and in the same direction of the relative scanning motion between the fiber and the selected location 126.

Under this arrangement, the fiber 160 moves relative to the selected location 126. The acoustic interference pattern also moves relative to the selected location 126 so that the fiber 160 and the acoustic interference pattern are essentially stationary with respect to each other. This arrangement can void the smearing in the written grating pattern in the fiber 160 that would otherwise be caused by the scanning nature of the system. In operation, the system controller 140 may operate to change the acoustic frequencies while keeping the frequency difference at the fixed amount. This change in the acoustic frequencies can cause the acoustic interference pattern to change so that different patterns can be written into different sections of the fiber 160. Because the entire acoustic interference pattern is essentially uniform within the overlapping region in the acousto-optic medium and determined by the instantaneous acoustic frequencies, the optical interference pattern formed by the beams 121 and 122 at the location 126 is uniform at any given instant during operation. Hence, the spatial resolution of the system 200 is set by the dimension of the overlapping region of the beams 121 and 122 at the location 126, which may be approximately the dimension of each of the beams 121 and 126.

On the optical side, the system 200 uses a beam expander 210 with two lenses to expand the beam 112 to a desirable size comparable to the acoustic phase grating region in the medium 220. The optical imaging module 150 includes two lenses 230 and 234 to form a reversed microscope configuration. The focal length of the output lens 234 is less than that of the input lens 230 so that the relative angle between the two beams 121 and 122 is increased at the location 126 to achieve a desired fine spatial resolution. In addition, a beam block 232 is placed between the lenses 230 and 234 to block the zero-order beam from reaching the fiber 160.

The standing wave system 200 may use either a CW source or a pulsed source as the radiation source 110. If a pulsed laser is used, precise timing is maintained between the laser 110, the translational positioner 170, and the driver signal 132 for driving the acousto-optic element 120 so that two adjacent pulses spatially overlap on the fiber 160 as the fiber 160 is scanned through the location 126 and the optical exposure on the fiber 160 appears to be spatially continuous without gaps.

Figure 3:
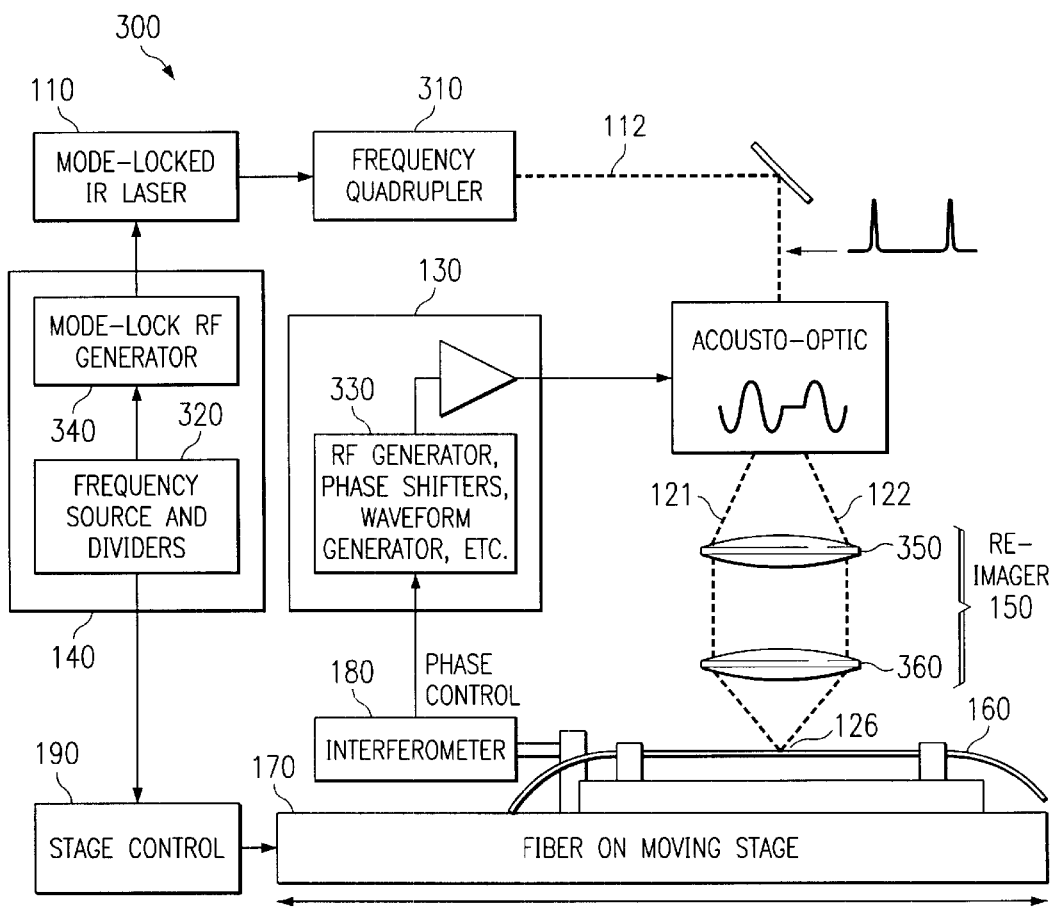
FIG. 3 shows another implementation of the grating writing system shown in FIG. 1.

FIG. 3 shows a "traveling wave" implementation 300 based on the system 100 in FIG. 1, where a single acoustic transducer is engaged to the acousto-optic medium to generate a traveling acoustic wave substantially perpendicular to the optical beam 112. The radiation source 110 is a pulsed laser whose repetition rate is controlled by the system controller 140. Similar to the pulsed standing wave system in FIG. 2, the precise timing is maintained between the laser 110, the translational positioner 170, and the driver signal 132 for driving the acousto-optic element 120 so that two adjacent pulses spatially overlap on the fiber 160 as the fiber 160 is scanned through the location 126 and the optical exposure on the fiber 160 appears to be spatially continuous without gaps. Different from the standing wave system in FIG. 2, the interference between two acoustic waves is no longer needed to diffract the input optical beam 112. Instead, a single acoustic wave is used to diffract the optical beam 112 to produce the two diffraction beams 121 and 122. This feature of the traveling wave system 300 is significant because it allows the spatial resolution in writing the grating in the fiber 160 to be less than the dimension of beam overlapping region at the location 126.

More specifically, the traveling wave system 300 is designed so that, within each pulse period of the beam 112, the acoustic wave pattern on the traveling acoustic wave is no longer uniform in the acousto-optic medium across the beam 112. Instead, the acoustic wave pattern can have a varying and complex spatial profile across the beam 112 in the acousto-optic medium. The acoustic transducer is driven in a way that this acoustic spatial profile repeats in time with some phase shift that is proportional to the movement of the fiber 160 relative to the location 126. The phase shift is set so that the image of the varying spatial profile moves with the fiber 160. In this context, the varying spatial profile is "frozen" and captured by a short UV illumination pulse 112 and is imprinted on the two diffraction beams 121 and 122. These two diffraction beams 121 and 122 are then directed to overlap and interfere at the location 126 to produce an optical interference pattern on the fiber 160. The pulse duration of the input beam 112 is short so that the frequency-shifted diffraction beams 121 and 122 due to the motion of the traveling acoustic wave in the acousto-optic medium are coherent with each other during the pulse duration. The complex waveform in the acoustic wave hence can be imprinted on the fiber 160 by exposure to the optical interference pattern without smearing. Because the "frozen" spatial features are within the width of the beam 112 in the acousto-optic medium, the spatial resolution of the grating pattern in the fiber 160 is less than the dimension of the overlapping region of the two beams 121 and 122 at the location 126.

The system 300 may use a mode-locked laser as the light source 110. The control module 140 may include devices that control the operation of the mode-locked laser 110. For example, a mode-lock RF generator 340 may be used to generate the RF clock signal to control the pulse repetition rate of the laser 110. A waveform generator 330 may be used to generate a waveform signal to the AO driver 130 with desired phase shifts. The operations of the devices 340 and 330 are synchronized to timing signals from a frequency source 320. The pulsed laser output from the laser 110 may be modified by a frequency quadrupler 310 to produce the beam 112. The optical imaging module 150 may include two lenses 350 and 360 to focus the diffraction beams 121 and 122 to the location 126 where the fiber 160 is exposed.

Figure 4:
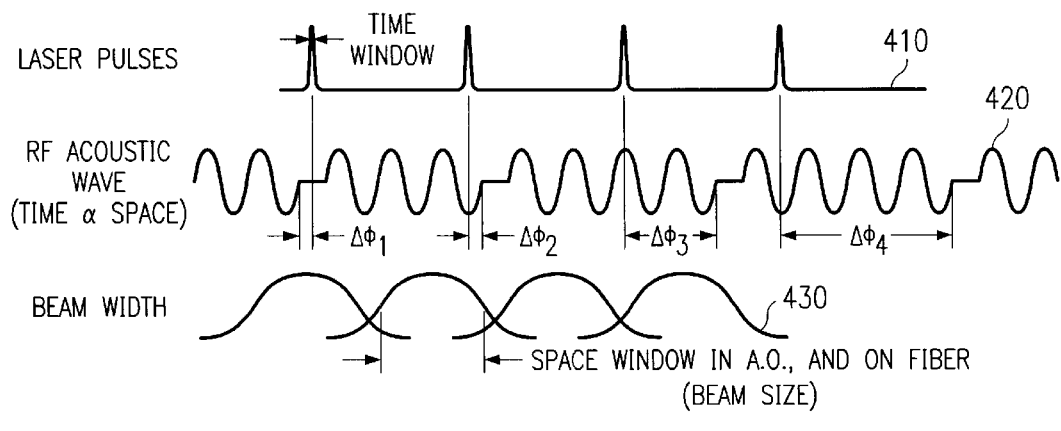
FIG. 4 illustrates the operation of the grating writing system in FIG. 3.

FIG. 4 illustrates the operation of this traveling wave system 300. Trace 410 shows optical pulses in the beam 121 in the time domain. Trace 420 shows exemplary repetitive waveforms with respective phase shifts for several adjacent pulses. The time scale of the trace 420 is enlarged to show the features in the waveforms and the phase shifts. Trace 430 shows the pulse shape of the pulses and the relative positions the waveforms in trace 420 in the pulses. As illustrated, the same waveform is repeated in the acoustic wave with phase shifts so that the same waveform in the acoustic wave appears stationary relative to the fiber 160 as the fiber 160 is scanned relative to the location 126.

The traveling wave scheme adds the advantage of being able to put phase shifts within a beam, thus achieving higher resolution than the beam size. Resolution of grating features is limited to the size of the writing beam with the typical direct-writing schemes, because the pattern across the beam is uniform. With the traveling wave scheme, a phase shift or other feature can be imposed on the fringe pattern within the beam. This can be achieved using fast phase shifters or amplitude modulators in the RF circuitry included in the waveform generator 330.

As the grating writing system is scanned across the fiber, the relative position between the writing system and the fiber can be precisely known. When a sharp feature is to be written, the RF circuitry in the waveform generator 330 imposes a feature on the AO wave through the acoustic transducer. The timing of the pulsed illumination by the beam 112 and the traveling acoustic wave is such that the phase or amplitude feature is exposed on the fiber in the same place every pulse, even when the writing device moves. As the writer moves, the acoustic features move accordingly. This operation can be achieved with modern microwave equipment.

In both systems 200 and 300, the beam 112 is diffracted from a programmable, complex phase pattern which can be used to finely control the resulting interference pattern at the grating. Compared to other moving-mask direct-writing systems, the AO implementation is more versatile in that it can scan an arbitrarily long fiber grating and vary the grating period or phase shifts according to any programmed function. This is because the "mask" period in the AO is movable and variable via programmed RF waveforms.

The system 200 in FIG. 2, when employing a pulsed laser as the light source 110, may also operate to produce a spatial resolution less than the dimension of the beam overlapping region at the location 126. Similar to the system 300 in FIG. 3, the waveform generator 330 can be synchronized to the timing of the pulses in the beam 112 to drive the transducers 221 and 222 with a complex waveform so that the acoustic interference pattern is no longer a uniform sinusoidal interference pattern but has different spatial features. The short optical pulses can freeze and capture these features and imprint them to the fiber 160. In one implementation, the two acoustic waves may be opposite to each other in the acousto-optic medium to form a standing acoustic wave that diffracts the input beam 112.

Although the present disclosure only includes a few embodiments, it is understood that various modifications and enhancements may be made without departing from the following claims.

What is claimed is:

1. A system, comprising:

a light source operable to produce an optical beam;

an acousto-optic element having a transducer to produce an acoustic wave in response to a driver signal applied to said transducer and positioned to diffract said optical beam to produce first and second diffraction beams at two different directions;

an optical imaging module configured and positioned to receive and direct said first and said second diffraction beams to overlap at a selected location where said first and said second diffraction beams interfere to form a spatial interference pattern determined by a property of said acoustic wave;

a positioning stage configured and positioned to hold an optical fiber at said selected location, exposing the fiber to said interference pattern to write a grating pattern in the fiber; and a controller operable to control said driver signal and thus said interference pattern by controlling said property of said acoustic wave.

2. The system as in claim 1, wherein said acousto-optic element is configured to operate in the Raman-Nath regime.

3. The system as in claim 1, wherein said light source is a pulsed light source.

4. The system as in claim 3, wherein said controller is configured to control timing of optical pulses of said pulsed light source so that a waveform in said acoustic wave repeats in consecutive pulses with varying phase shifts that associated with a relative motion between said positioning stage and said selected location.

5. The system as in claim 3, wherein said pulsed light source is a mode locked laser.

6. The system as in claim 1, further comprising a mechanism operable to control and change a relative position of said positioning stage with respect to said selected location to expose different parts of the fiber to said interference pattern.

7. The system as in claim 6, wherein said controller is configured to vary said interference pattern with said relative position to produce a spatially-varying grating pattern in the fiber.

8. The system as in claim 6, wherein said property of said acoustic wave includes a frequency of said acoustic wave.

9. A system, comprising:

a light source operable to produce an optical beam;

an acousto-optic element having first and second transducers to produce first and second acoustic waves in different directions, respectively, that intercept and interfere to form an acoustic interference pattern to diffract said optical beam, thus producing first and second diffraction beams at two different directions;

an optical imaging module configured and positioned to receive and direct said first and said second diffraction beams to overlap at a selected location where said first and said second diffraction beams interfere to form a spatial interference pattern determined by characteristics of said first and second acoustic waves;

a positioning stage configured and positioned to hold an optical fiber at said selected location, exposing the fiber to said spatial interference pattern to write a grating pattern in the fiber; and a controller operable to control driver signals applied to said first and said second transducers and hence control said interference pattern by controlling said characteristics of said first and said second acoustic waves.

10. The system as in claim 9, further comprising a mechanism operable to control and change a relative position of said positioning stage with respect to said selected location to expose different parts of the fiber to said interference pattern.

11. The system as in claim 9, wherein said first and said second acoustic waves have different acoustic frequencies so that said acoustic interference pattern moves along a longitudinal direction of the fiber.

12. The system as in claim 11, further comprising a mechanism operable to control and change a relative position of said positioning stage with respect to said selected location to expose different parts of the fiber to said interference pattern at a speed substantially equal to a speed of said acoustic interference pattern.

13. The system as in claim 9, wherein said first and said second acoustic waves have a fixed difference in their acoustic frequencies, and wherein said controller operates to vary said acoustic frequencies without changing said fixed difference.

14. The system as in claim 9, wherein said acousto-optic element is configured to operate in the Raman-Nath regime.

15. The system as in claim 9, wherein said light source is a pulsed light source.

16. The system as in claim 9, wherein said light source is a CW light source.

17. A system, comprising:

a light source operable to produce an optical beam;

an acousto-optic element having at least one transducer to produce an acoustic wave in response to a driver signal applied to said transducer and positioned to diffract said optical beam to produce first and second diffraction beams at two different directions;

an optical imaging module configured and positioned to receive and direct said first and said second diffraction beams to overlap at a selected location where said first and said second diffraction beams interfere to form a spatial interference pattern determined by a property of said acoustic wave; and a controller operable to control said driver signal and thus said interference pattern by controlling said property of said acoustic wave.

18. The system as in claim 17, wherein said acousto-optic element is configured to operate in the Raman-Nath regime.

19. A method, comprising:

using an acousto-optic element, which has at least one transducer to produce an acoustic wave in response to a driver signal applied to said transducer, to diffract an optical beam to produce first and second diffraction beams at two different directions;

directing said first and said second diffraction beams to spatially overlap each other at a selected location to produce an optical interference pattern; and placing a fiber whose refractive index is responsive to said optical beam at said selected location to expose to said optical interference pattern, hence producing an index pattern in the fiber to effectuate a grating.

20. The method as in claim 19, further comprising configuring and operating said acousto-optic element in the Raman-Nath regime.

* * * * *